United States Patent
Hu et al.

(10) Patent No.: US 12,505,030 B2
(45) Date of Patent: Dec. 23, 2025

(54) FAIR METHOD FOR SELECTING REGRESSION CASES

(71) Applicant: Dell Products L.P., Round Rock, TX (US)

(72) Inventors: Bernie Hu, Chengdu (CN); Shuang Zheng, Chengdu (CN); Ellie Jiang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 221 days.

(21) Appl. No.: 18/237,979

(22) Filed: Aug. 25, 2023

(65) Prior Publication Data
US 2025/0036556 A1   Jan. 30, 2025

(30) Foreign Application Priority Data
Jul. 27, 2023   (CN) .......................... 202310937000.3

(51) Int. Cl.
*G06F 11/3668* (2025.01)

(52) U.S. Cl.
CPC ................................ *G06F 11/3692* (2013.01)

(58) Field of Classification Search
CPC .......................... G06F 11/3692; G06F 11/3688
USPC ....................................................... 717/124
See application file for complete search history.

(56) References Cited

U.S. PATENT DOCUMENTS

| | | | | |
|---|---|---|---|---|
| 6,601,017 | B1* | 7/2003 | Kennedy | G06F 11/3684 702/182 |
| 7,613,953 | B2* | 11/2009 | Voruganti | G06F 11/3688 714/38.1 |
| 9,830,255 | B2* | 11/2017 | Raghavan | G06F 11/3684 |
| 10,127,143 | B2* | 11/2018 | Hamilton, II | G06F 11/3684 |
| 2009/0265681 | A1* | 10/2009 | Beto | G06F 11/3688 717/100 |
| 2021/0349812 | A1* | 11/2021 | Culibrk | G06F 11/3698 |
| 2022/0342663 | A1* | 10/2022 | Barkaee | G06F 8/77 |
| 2024/0028500 | A1* | 1/2024 | Du | G06F 11/3684 |

OTHER PUBLICATIONS

Kazmi, Rafaqut, et al. "Effective regression test case selection: A systematic literature review." ACM Computing Surveys (CSUR) 50.2 (2017): pp. 1-32. (Year: 2017).*
Biswas, Swarnendu, et al. "Regression test selection techniques: A survey." Informatica 35.3 (2011). pp. 289-322. (Year: 2011).*

(Continued)

*Primary Examiner* — Satish Rampuria
(74) *Attorney, Agent, or Firm* — Krishnendu Gupta; Lesley Leonessa

(57) ABSTRACT

Methods, system, and non-transitory processor-readable storage medium for a test selection system are provided herein. An example method includes selecting a regression test case from a plurality of regression test cases in a software testing lifecycle system. A test selection system calculates a score for the regression test case using an Analytic Hierarchy Process (AHP) assigned weight. Using the score, the test selection system visualizes a relationship between the regression test case and goals associated with a regression testing effort. The test selection system selects the regression test case for use in the regression testing effort based on the visualized relationship, and executes the regression test case on a system.

19 Claims, 8 Drawing Sheets

(56) References Cited

OTHER PUBLICATIONS

Yoo, Shin, and Mark Harman. "Regression testing minimization, selection and prioritization: a survey." Software testing, verification and reliability 22.2 (2012): pp. 67-120. (Year: 2012).*

Jones, James A., Mary Jean Harrold, and John Stasko. "Visualization of test information to assist fault localization." Proceedings of the 24th international conference on Software engineering. 2002. pp. 467-477. (Year: 2002).*

Yuan, Ming, and Yi Lin. "Model selection and estimation in regression with grouped variables." Journal of the Royal Statistical Society Series B: Statistical Methodology 68.1 (2006): pp. 49-67. (Year: 2006).*

Chittimalli, Pavan Kumar, and Mary Jean Harrold. "Regression test selection on system requirements." Proceedings of the 1st India software engineering conference. 2008. pp. 87-96. (Year: 2008).*

\* cited by examiner

| O | RUNTIME | CREATE TIME | FEATURE COVER | FEATURE OVER LAP | TEST COVERAGE | TEST OVER LAP | DEFECT TICKET | CODE COVERAGE |
|---|---|---|---|---|---|---|---|---|
| RUNTIME | 1 | 1 | 1/8 | 1 | 1/6 | 2 | 1/6 | 1/7 |
| CREATE TIME | 1 | 1 | 1/8 | 1 | 1/6 | 2 | 1/6 | 1/7 |
| FEATURE COVERAGE | 8 | 8 | 1 | 3 | 2 | 3 | 2 | 1 |
| FEATURE OVER LAP | 1 | 1 | 1/3 | 1 | 1/6 | 2 | 1/6 | 1/7 |
| TEST COVERAGE | 6 | 6 | 1/2 | 6 | 1 | 9 | 1 | 1 |
| TEST OVER LAP | 1/2 | 1/2 | 1/3 | 1/2 | 1/9 | 1 | 1/9 | 1/9 |
| DEFECT TICKET | 6 | 6 | 1/2 | 6 | 1 | 9 | 1 | 1 |
| CODE COVERAGE | 7 | 7 | 1 | 7 | 1 | 9 | 1 | 1 |

FIG. 4

| O | RUNTIME | CREATE TIME | FEATURE COVER | FEATURE OVER LAP | TEST COVERAGE | TEST OVER LAP | DEFECT TICKET | CODE COVERAGE |
|---|---|---|---|---|---|---|---|---|
| RUNTIME | 0.0328 | 0.0328 | 0.0319 | 0.0392 | 0.0297 | 0.054 | 0.0297 | 0.315 |
| CREATE TIME | 0.0328 | 0.0328 | 0.0319 | 0.0392 | 0.0297 | 0.054 | 0.0297 | 0.315 |
| FEATURE COVERAGE | 0.2623 | 0.2623 | 0.2553 | 0.1176 | 0.3565 | 0.081 | 0.3565 | 0.2202 |
| FEATURE OVER LAP | 0.0328 | 0.0328 | 0.085 | 0.0392 | 0.0297 | 0.054 | 0.0297 | 0.315 |
| TEST COVERAGE | 0.1967 | 0.1967 | 0.1276 | 0.2353 | 0.1783 | 0.2432 | 0.1783 | 0.2202 |
| TEST OVER LAP | 0.0164 | 0.0164 | 0.085 | 0.0196 | 0.0198 | 0.027 | 0.0198 | 0.0245 |
| DEFECT TICKET | 0.1967 | 0.1967 | 0.1276 | 0.2353 | 0.1783 | 0.2432 | 0.1783 | 0.2202 |
| CODE COVERAGE | 0.2295 | 0.2295 | 0.2553 | 0.2745 | 0.1783 | 0.2432 | 0.1783 | 0.2202 |

FIG. 5

FIG. 6A
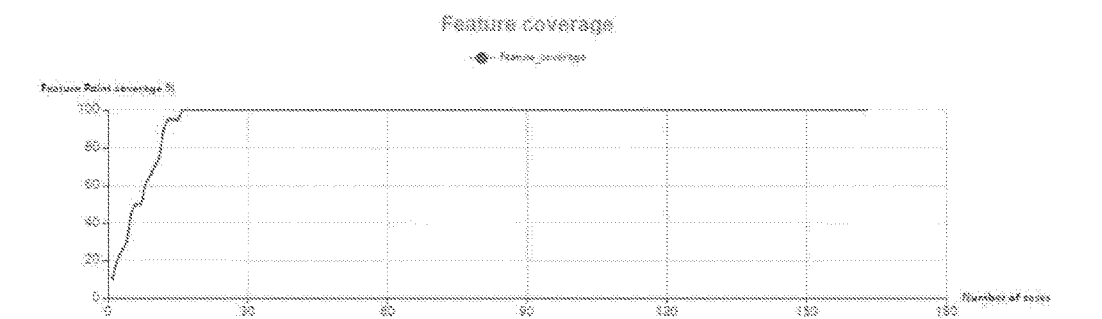
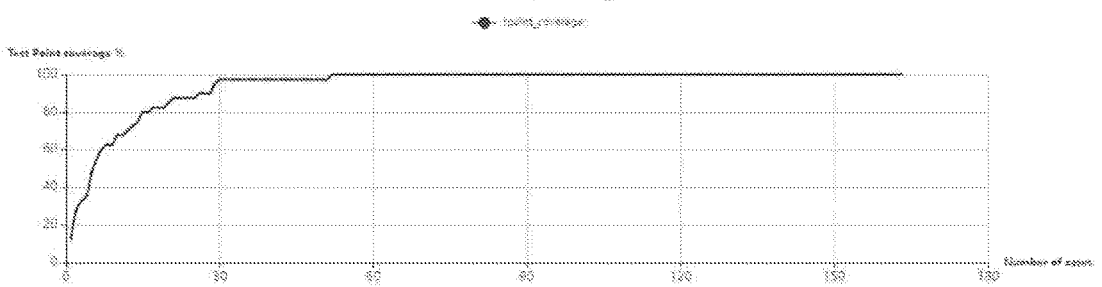
FIG. 6B

FAIR METHOD FOR SELECTING REGRESSION CASES

FIELD

The field relates generally to optimizing selection of regression test cases, and more particularly to quantifying and optimizing selection of regression test cases in information processing systems.

BACKGROUND

System test is a critical part of the pre-release quality engineering activities for information processing systems. There are two important parts of the system test phase; new feature tests and regression test cases. There may be thousands of system regression test cases for complicated information processing systems, such as storage products.

SUMMARY

Illustrative embodiments provide techniques for implementing a test selection system in a storage system. For example, illustrative embodiments select a regression test case from a plurality of regression test cases in a software testing lifecycle system. A test selection system calculates a score for the regression test case using an Analytic Hierarchy Process (AHP) assigned weight. Using the score, the test selection system visualizes a relationship between the regression test case and goals associated with a regression testing effort. The test selection system selects the regression test case for use in the regression testing effort based on the visualized relationship, and executes the regression test case on a system. Other types of processing devices can be used in other embodiments. These and other illustrative embodiments include, without limitation, apparatus, systems, methods and processor-readable storage media.

BRIEF DESCRIPTION OF THE DRAWINGS

FIG. 4. illustrates a comparison table based on criteria in an illustrative embodiment.

FIG. 5. illustrates a comparison table with normalized data in an illustrative embodiment.

FIGS. 6A and 6B illustrate feature coverage and test point coverage visualized in an elbow plot in an illustrative embodiment.

DETAILED DESCRIPTION

Figure 1:
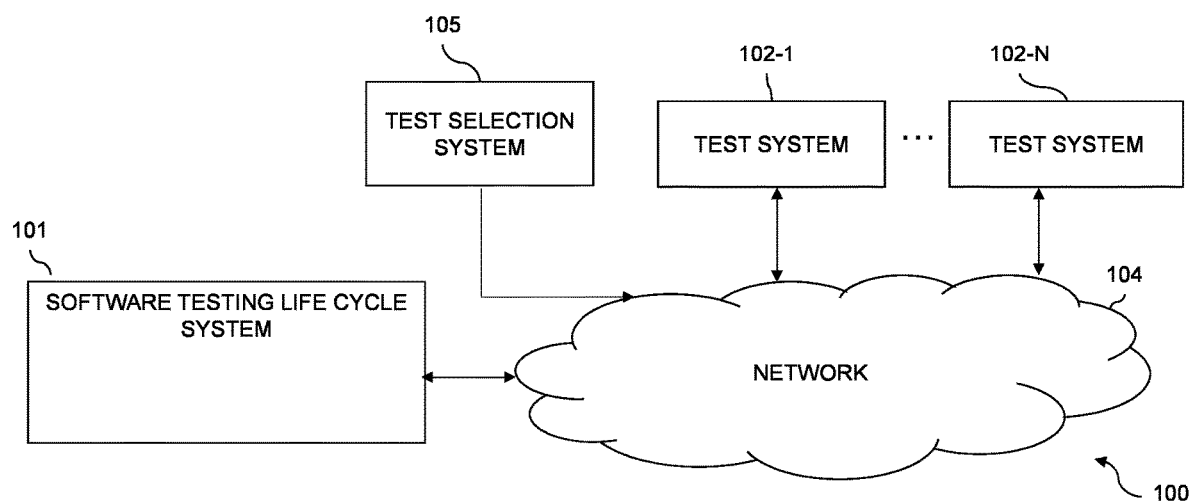
FIG. 1 shows an information processing system including a test selection system in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a test selection system, which technique may be used to provide, among other things regression test case selection quantification and optimization by selecting a regression test case from a plurality of regression test cases in a software testing lifecycle system. A test selection system calculates a score for the regression test case using an Analytic Hierarchy Process (AHP) assigned weight. Using the score, the test selection system visualizes a relationship between the regression test case and goals associated with a regression testing effort. The test selection system selects the regression test case for use in the regression testing effort based on the visualized relationship, and executes the regression test case on a system.

The system test phase of the pre-release quality engineering activities for information processing systems may comprise thousands of regression test cases. Regression test cases must be executed to ensure that newly implemented features do not impact existing functionality. As noted above, there may be thousands of regression test cases. Yet, resources to execute those regression test cases may be limited. Therefore, it is crucial to select the most valuable subset of regression test cases to execution from the set of regression test cases.

Conventional technologies do not provide a way to evaluate the value and weight of regression test cases. Engineers may have difficulty selecting the appropriate regression test cases, especially when they are not the owner of the regression test case. The hardware resources and human resources may change from product release to product release, and may be reduced. Teams may not have the bandwidth to rerun the full set of regression test cases for new product releases. Conventional technologies do not provide a way to select the best regression test cases to adequately provide regression testing coverage of the new features in the new product releases, especially when resources are limited. Conventional technologies do not quantify the optimal number of regression cases and then select those optimal regression cases. Conventional technologies measure the value of a regression test case based on a single factor, such as the number of defects detected by the regression test case, or the amount of test code covered, and can easily overlook the value of a regression test case in other aspects. For example, a regression test case that is developed to test a new feature may have been executed fewer times, and therefore, may have detected fewer defects. In this example scenario, measuring the value of a newly developed regression test case based on the number of defects detected incorrectly assesses the newly developed regression test case as less valuable than it is. Conventional technologies do not consider multiple factors. Conventional technologies do not assign a fair weight to each factor of a regression test case. Conventional technologies do not consider feature overlap, test point overlap, execution time, and regression test case creation time when evaluating regression test cases. Conventional technologies do not maximize some factors while minimizing other factors when evaluating the overall value of regression test cases. Conventional technologies do not use Analytic Hierarchy Process (AHP) to assign weights to factors used to evaluate regression test cases.

By contrast, in at least some implementations in accordance with the current technique as described herein, regression test case selection is optimized by selecting a regression test case from a plurality of regression test cases in a software testing lifecycle system. A test selection system calculates a score for the regression test case using an Analytic Hierarchy Process (AHP) assigned weight. Using the score, the test selection system visualizes a relationship between the regression test case and goals associated with a regression testing effort. The test selection system selects the regression test case for use in the regression testing effort based on the visualized relationship, and executes the regression test case on a system.

Thus, a goal of the current technique is to provide a method and a system for providing a test selection system that can quantify the optimal number of regression cases and select those optimal regression cases. Another goal is to measure the value of a regression test case based on multiple weighted factors. Another goal is to assign a fair weight to each factor of a regression test case. Another goal is to consider feature overlap, test point overlap, execution time, and regression test case creation time when evaluating regression test cases. Another goal is to maximize some factors while minimizing other factors when evaluating the overall value of regression test cases. Yet another goal is to use Analytic Hierarchy Process (AHP) to assign weights to factors used to evaluate regression test cases.

In at least some implementations in accordance with the current technique described herein, the use of a test selection system can provide one or more of the following advantages: quantify the optimal number of regression cases and select those optimal regression cases, measure the value of a regression test case based on multiple factors, assign a fair weight to each factor of a regression test case, consider feature overlap, test point overlap, execution time, and regression test case creation time when evaluating regression test cases, maximize some factors while minimizing other factors when evaluating the overall value of regression test cases, and use Analytic Hierarchy Process (AHP) to assign weights to factors used to evaluate regression test cases.

In contrast to conventional technologies, in at least some implementations in accordance with the current technique as described herein, regression test case selection is quantified and optimized by selecting a regression test case from a plurality of regression test cases in a software testing lifecycle system. A test selection system calculates a score for the regression test case using an Analytic Hierarchy Process (AHP) assigned weight. Using the score, the test selection system visualizes a relationship between the regression test case and goals associated with a regression testing effort. The test selection system selects the regression test case for use in the regression testing effort based on the visualized relationship, and executes the regression test case on a system.

In an example embodiment of the current technique, the test selection system identifies a plurality of valued factors associated with the regression test case.

In an example embodiment of the current technique, the test selection system normalizes a plurality of valued factors associated with the regression test case.

In an example embodiment of the current technique, the test selection system normalizes the plurality of valued factors using a min-max normalization.

In an example embodiment of the current technique, the test selection system determines a respective weight associated with each of a plurality of valued factors associated with the regression test case using AHP.

In an example embodiment of the current technique, the test selection system maximizes a subset of valued factors associated with the regression test case.

In an example embodiment of the current technique, the subset of value factors comprises feature coverage, code coverage, test point coverage, and defect ticket.

In an example embodiment of the current technique, the test selection system minimizes a subset of valued factors associated with the regression test case.

In an example embodiment of the current technique, the subset of value factors comprises feature overlap, test point overlap execution time and case creation time.

In an example embodiment of the current technique, the test selection system calculates a respective score for each regression test case in a plurality of regression test cases.

In an example embodiment of the current technique, the test selection system visualizes the relationship using an elbow method.

In an example embodiment of the current technique, the test selection system sorts a plurality of scores associated with a plurality of regression test cases.

In an example embodiment of the current technique, the test selection system visualizes a subset of the plurality of regression test cases associated with highest scores in the plurality of sorted scores.

In an example embodiment of the current technique, the test selection system visualizes the relationship to determine an optimal number of regression test cases to execute on the system.

In an example embodiment of the current technique, the test selection system selects an optimal number of regression test cases to execute on the system.

In an example embodiment of the current technique, the test selection system selects the optimal number of regression test cases from a subset of a plurality of regression test cases, where the subset of regression test cases has highest scores among the plurality of regression test cases.

In an example embodiment of the current technique, the test selection system executes a subset of a plurality of regression test cases, where the subset of regression test cases has highest scores among the plurality of regression test cases.

In an example embodiment of the current technique, the test selection system verifies the selection of the regression test case for use in the regression testing effort based on a change in defect tickets.

FIG. 1 shows a computer network (also referred to herein as an information processing system) 100 configured in accordance with an illustrative embodiment. The computer network 100 comprises a software testing life cycle system 101, test selection system 105, and test systems 102-N. The software testing life cycle system 101, test selection system 105, and test systems 102-N are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a test selection system 105 that may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the test systems 102-N may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The test systems 102-N in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the test selection system 105 are one or more input-output devices, which illustratively comprise keyboards, displays or other types of input-output devices in any combination. Such input-output devices can be used, for example, to support one or more user interfaces to the test selection system 105, as well as to support communication between the test selection system 105 and other related systems and devices not explicitly shown. For example, a dashboard may be provided for a user to view a progression of the execution of the test selection system 105. One or more input-output devices may also be associated with any of the test systems 102-N.

Additionally, the test selection system 105 in the FIG. 1 embodiment is assumed to be implemented using at least one processing device. Each such processing device generally comprises at least one processor and an associated memory, and implements one or more functional modules for controlling certain features of the test selection system 105.

More particularly, the test selection system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the test selection system 105 to communicate over the network 104 with the software testing life cycle system 101, and test systems 102-N and illustratively comprises one or more conventional transceivers.

A test selection system 105 may be implemented at least in part in the form of software that is stored in memory and executed by a processor, and may reside in any processing device. The test selection system 105 may be a standalone plugin that may be included within a processing device.

It is to be understood that the particular set of elements shown in FIG. 1 for test selection system 105 involving the software testing life cycle system 101, and test systems 102-N of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the test selection system 105 can be on and/or part of the same processing platform.

An exemplary process of test selection system 105 in computer network 100 will be described in more detail with reference to, for example, the flow diagram of FIG. 2.

Figure 2:
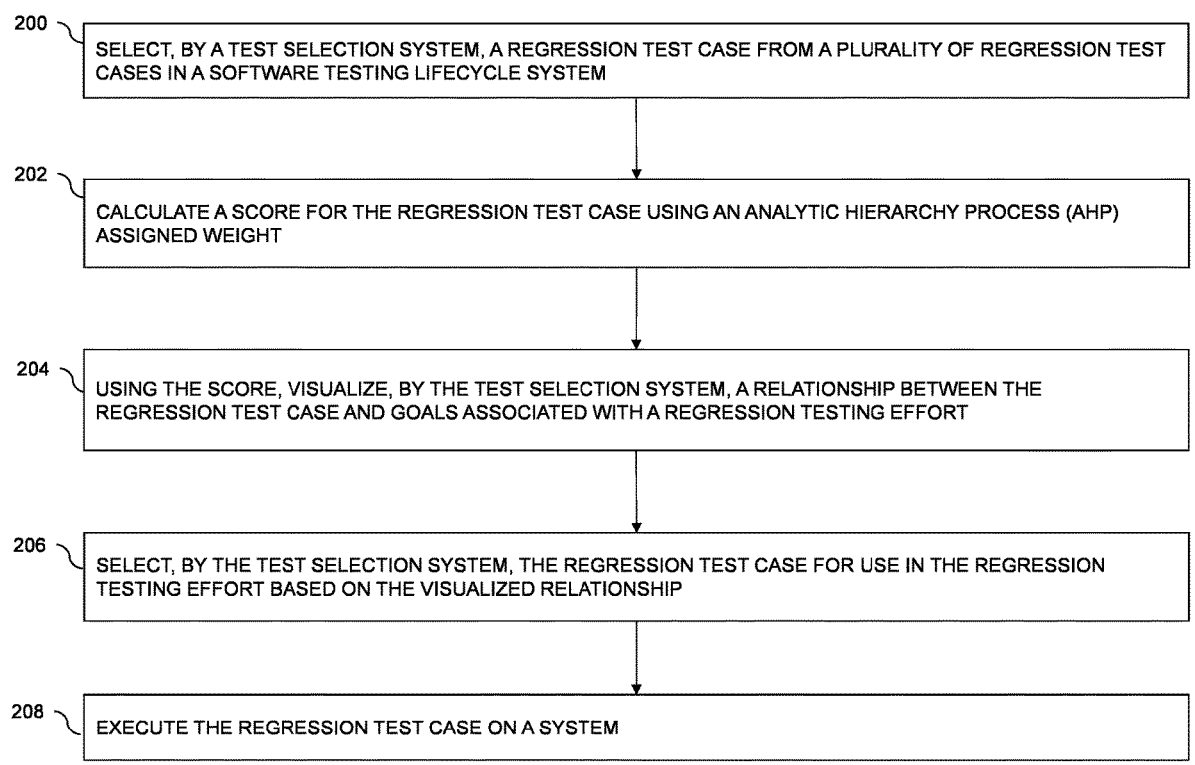
FIG. 2 shows a flow diagram of a process for a test selection system in an illustrative embodiment.

FIG. 2 is a flow diagram of a process for execution of the test selection system 105 in an illustrative embodiment. It is to be understood that this particular process is only an example, and additional or alternative processes can be carried out in other embodiments.

At 200, the test selection system 105 selects a regression test case from a plurality of regression test cases in a software testing lifecycle system. In an example embodiment, the test selection system 105 will individually select each regression test case from the plurality of regression test cases to evaluate each regression test case to identify the optimal subset of regression test cases for each product release.

At 202, the test selection system 105 calculates a score for the regression test case using an Analytic Hierarchy Process (AHP) assigned weight. In an example embodiment, the test selection system 105 considers multiple factors simultaneously, including test point overlap and feature overlap, along with other relevant factors, and quantifies those factors. In an example embodiment, the test selection system 105 identifies a plurality of valued factors associated with the regression test case. For example, the test selection system 105 quantifies eight valued factors. In an example embodiment, the valued factors comprise runtime, creation time (i.e., when the regression test case was developed), feature coverage (i.e., the number of features covered), feature overlap (i.e., the number of features that overlap), test point coverage (i.e., the number of test points covered), test point overlap (i.e., the number of test points that overlap), defect ticket, and test code covered (i.e., the lines of test code that are covered by the regression test case). In an example embodiment, the test selection system 105 may value a more recently developed regression test case higher than an earlier developed regression test case when evaluating the creation time valued factor.

Figure 3:
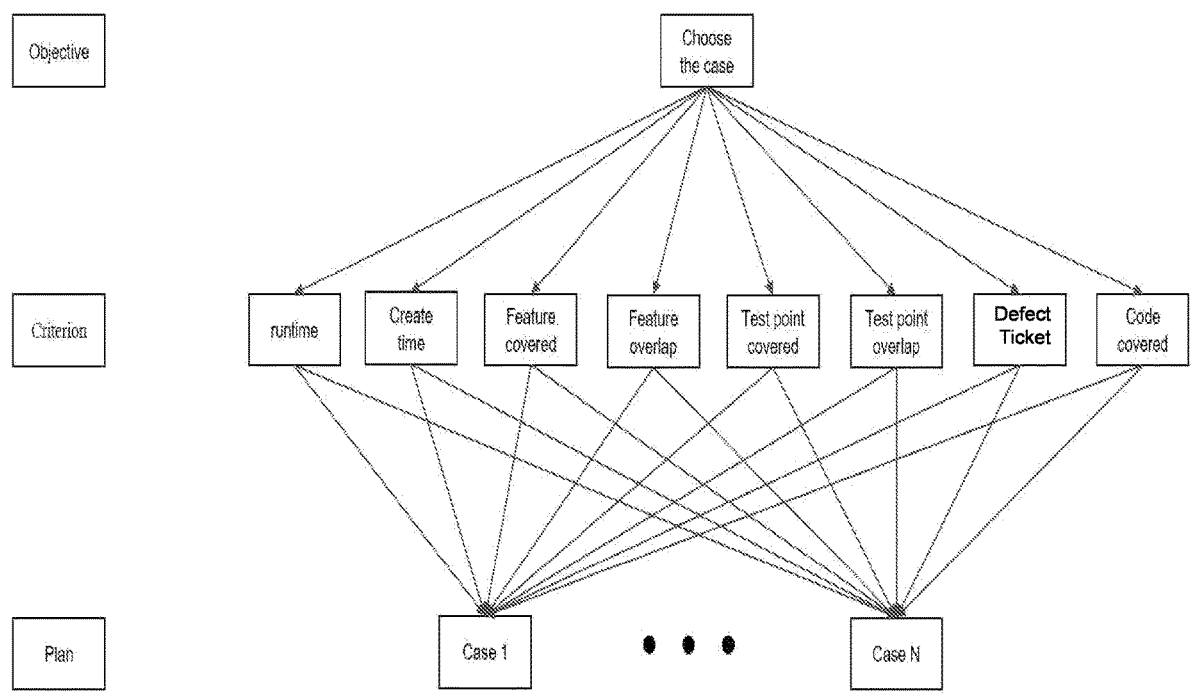
FIG. 3. illustrates a hierarchical graph in an illustrative embodiment.

In an example embodiment, the test selection system 105 constructs a hierarchical graph to obtain the weights of the valued factors. FIG. 3 illustrates an example hierarchical graph. In an example embodiment, the test selection system 105 performs a consistency check before normalizing the data.

FIG. 4 illustrates a comparison table based on the valued factors to insure consistency. Listed below are the value and the criterion used in FIG. 4, where "I" is the horizontal axis and "J" is the vertical axis.

| Value | Criterion |
|---|---|
| 1 | I is as important as J |
| 3 | I is slightly more important than J |
| 5 | I is noticeably more important than J |
| 7 | I is strongly more important than J |
| 9 | I is extremely more important than J |
| 2-8 | Median of adjacent comparisons |
| 1/n | Comparison of J and I |

In an example embodiment, the test selection system 105 normalizes a plurality of valued factors associated with the regression test case. In an example embodiment, after passing the consistency check, the test selection system 105 normalizes the data. The normalization may be performed a number of various ways. In an example embodiment, the test selection system 105 normalizes the plurality of valued factors using a min-max normalization. FIG. 5 illustrates an example of normalized data.

In an example embodiment, the test selection system 105 determines a respective weight associated with each of a plurality of valued factors associated with the regression test case using AHP. The test selection system 105 uses AHP to ensure fair weighting of the valued factor and to assign appropriate weights to each of the valued factors. In an example embodiment, the test selection system 105 obtains the respective weight of each valued factor after normalizing the data.

example embodiment, the test selection system 105 visualizes the relationship using an elbow method. For example, the test selection system 105 draws an elbow diagram to visualize the relationship between the number of regression test cases in the plurality of regression test cases and the goals the regression testing effort is focused on, for example, test feature coverage and test code coverage. In an example embodiment, the test selection system 105 sorts a plurality of scores associated with a plurality of regression test cases. In other words, the test selection system 105 sorts the plurality of regression test cases based on their respective scores. In an example embodiment, the test selection system 105 visualizes a subset of the plurality of regression test cases associated with the highest scores in the plurality of sorted scores. The test selection system 105 selects the regression test cases with the highest scores to visualize using the elbow method.

In an example embodiment, the test selection system 105 visualizes the relationship to determine an optimal number of regression test cases to execute on the system. In an example embodiment, the test selection system 105 performs the selection and visualizing as an iterative process. In an example embodiment, the test selection system 105 draws the elbow diagram by gradually increasing the number of regression test cases and measuring the different coverages achieved by selecting those regression test cases. The regression test cases with the highest scores are selected for each iteration, and therefore, the test coverage gradually increases until it reaches 100%. Because the number of regression test cases is much higher than the number of features, the graph draw resembles an elbow, as illustrated in FIGS. 6A and 6B. In an example embodiment, the inflection point is the recommended number of regression test cases. The inflection point in the elbow chart represents the point at which the marginal benefit of adding more regression test cases begins to diminish significantly. In an example embodiment, the recommended number of regression test cases is set to be the number of regression test cases at the inflection point.

At 206, the test selection system 105 selects the regression test case for use in the regression testing effort based on the

| runtime | Creation time | Feature cover | Feature overlap | Test code cover | Test code overlap | Defect ticket | Code coverage |
|---|---|---|---|---|---|---|---|
| 0.071 | 0.071 | 0.239 | 0.077 | 0.197 | 0.029 | 0.197 | 0.266 |

In an example embodiment, the test selection system 105 maximizes a subset of valued factors associated with the regression test case, for example, feature coverage, code coverage, test point coverage, and defect ticket. In an example embodiment, the test selection system 105 minimizes a subset of valued factors associated with the regression test case, such as feature overlap, test point overlap execution time and case creation time. In an example embodiment, the test selection system 105 uses the weights and the valued factors to calculate a respective score for each regression test case in a plurality of regression test cases. In an example embodiment, after obtaining the weight of each valued factor, the test selection system 105 uses the weights and the valued factors to calculate a respective score for each regression test case in a plurality of regression test cases.

At 204, using the score, visualizing, by the test selection system, a relationship between the regression test case and goals associated with a regression testing effort. In an visualized relationship. In an example embodiment, the test selection system 105 determines an optimal number of regression test cases to execute on the system. As noted above, the test selection system 105 visualizes the relationship to determine an optimal number of regression test cases to execute on the system. The test selection system 105 selects the optimal number of regression test cases from a subset of a plurality of regression test cases, where the subset of regression test cases has the highest scores among the plurality of regression test cases. In other words, the test selection system 105 obtains the optimal number of regression test case to execute from the visualization and then selects that number of regression test cases from the sorted list of regression test cases (i.e., the regression test cases with the highest scores) to execute during the regression testing effort.

At 208, the software testing life cycle system 101 executes the regression test case on a system. In an example embodiment, the software testing life cycle system 101 executes a subset of a plurality of regression test cases, where the subset of regression test cases has the highest scores among the plurality of regression test cases. In an example embodiment, the test selection system 105 verifies the selection of the regression test case for use in the regression testing effort based on a change in defect tickets. For example, when a new feature is merged into a product, the number of defect tickets may show an increasing trend because the new feature may have introduced additional defects into the product. One goal of regression testing is to detect these newly introduced defects as quickly as possible, such as during pre-production, and not after product release. Thus, the number of defect tickets becomes a convergence trend, in that the number of defect tickets increases and then decreases over time. In this example scenario, selecting the optimal regression test case results in detecting more of the newly introduced defects earlier.

In another example embodiment, the newly added feature may result in an additional 20 defects identified during regression testing. In this example scenario, the test selection system 105 verifies the selection of the regression test case based on the number of defects detected by the selected regression test case. For example, if the selected regression test case detects 17 of the 20 additional defects caused by the newly added feature, then the selected regression test case is at least one of the optimal regression test cases for testing the newly added feature.

Accordingly, the particular processing operations and other functionality described in conjunction with the flow diagram of FIG. 2 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve quantification and identification of an optimal subset of regression test cases for each product release. These and other embodiments can effectively improve regression testing for each product release relative to conventional approaches. For example, embodiments disclosed herein measure the value of a regression test case based on multiple factors. Embodiments disclosed herein assign a fair weight to each factor of a regression test case. Embodiments disclosed herein consider feature overlap, test point overlap, execution time, and regression test case creation time when evaluating regression test cases. Embodiments disclosed herein maximize some factors while minimizing other factors when evaluating the overall value of regression test cases. Embodiments disclosed herein use Analytic Hierarchy Process (AHP) to assign weights to factors used to evaluate regression test cases.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of the information processing system 100, these platforms may also be used to implement at least portions of other information processing systems in other embodiments.

Figure 7:
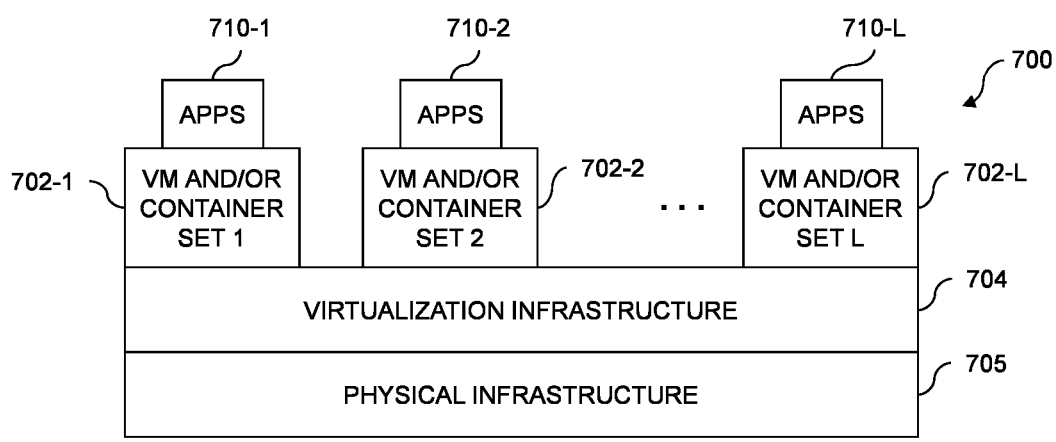
FIGS. 7 and 8 show examples of processing platforms that may be utilized to implement at least a portion of a test selection system embodiments.
Figure 8:
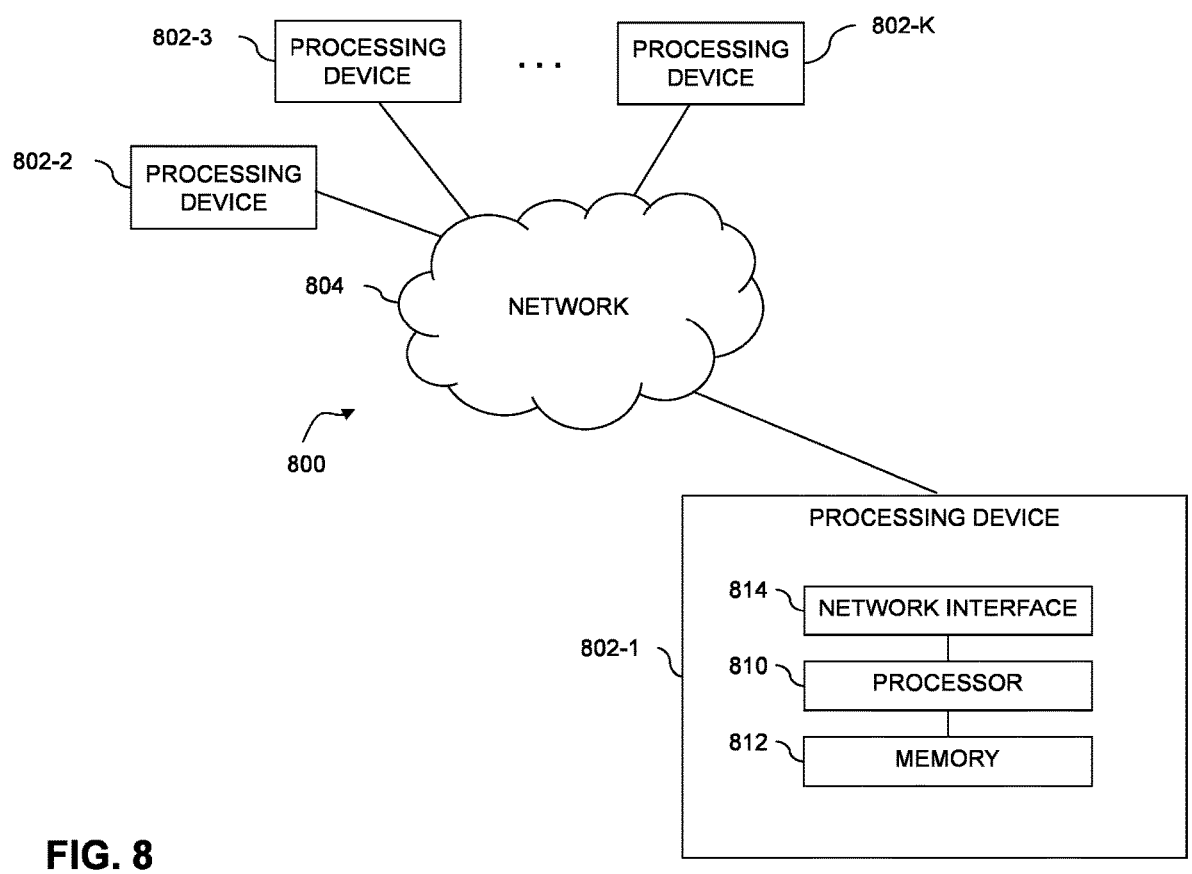

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, where the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of the information processing system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numer-

What is claimed is:

1. A method comprising:
selecting, by a test selection system, a regression test case from a plurality of regression test cases in a software testing lifecycle system;
calculating a score for the regression test case using an Analytic Hierarchy Process (AHP) assigned weight, wherein the AHP assigned weight is determined based on multiple valued factors including feature coverage, code coverage, test point coverage, and defect ticket;
using the score, automatically generating, by the test selection system, a visual representation displaying quantified relationships between the regression test case and specific regression testing coverage objectives for the software system;
selecting, by the test selection system, the regression test case for use in the regression testing effort based on the visualized relationship that demonstrates optimal resource allocation for achieving the regression testing coverage objectives;
automatically executing the regression test case on a system to detect software defects, wherein the method is implemented by at least one processing device comprising a processor coupled to a memory; and
visualizing the relationship to determine an optimal number of regression test cases to execute on the system by displaying a graphical representation showing how incremental addition of regression test cases affects achievement of regression testing coverage goals until reaching an inflection point where the marginal benefit of adding more regression test cases begins to diminish significantly.

2. The method of claim 1 wherein calculating the score for the regression test case comprises:
identifying a plurality of valued factors associated with the regression test case.

3. The method of claim 1 wherein calculating the score for the regression test case comprises:
normalizing a plurality of valued factors associated with the regression test case.

4. The method of claim 3 wherein normalizing the plurality of valued factors comprises:
normalizing the plurality of valued factors using a min-max normalization.

5. The method of claim 1 wherein calculating the score for the regression test case comprises:
determining a respective weight associated with each of a plurality of valued factors associated with the regression test case using AHP.

6. The method of claim 1 wherein calculating the score for the regression test case comprises:
maximizing a subset of valued factors associated with the regression test case.

7. The method of claim 6 wherein the subset of value factors comprises feature coverage, code coverage, test point coverage, and defect ticket.

8. The method of claim 1 wherein calculating the score for the regression test case comprises:
minimizing a subset of valued factors associated with the regression test case.

9. The method of claim 8 wherein the subset of value factors comprises feature overlap, test point overlap execution time and case creation time.

10. The method of claim 1 wherein calculating the score for the regression test case comprises:
calculating a respective score for each regression test case in a plurality of regression test cases.

11. The method of claim 1 wherein using the score, visualizing, by the test selection system, the relationship between the regression test case and goals associated with a regression testing effort comprises:
visualizing the relationship using an elbow method that plots regression test case coverage against the number of selected regression test cases to identify an optimal inflection point for regression testing efficiency.

12. The method of claim 1 wherein using the score, visualizing, by the test selection system, the relationship between the regression test case and goals associated with a regression testing effort comprises:
sorting a plurality of scores associated with a plurality of regression test cases.

13. The method of claim 12 further comprising:
visualizing a subset of the plurality of regression test cases associated with highest scores in the plurality of sorted scores.

14. The method of claim 1 wherein selecting, by the test selection system, the regression test case for use in the regression testing effort based on the visualized relationship comprises:
selecting an optimal number of regression test cases to execute on the system.

15. The method of claim 14 further comprising:
selecting the optimal number of regression test cases from a subset of a plurality of regression test cases, wherein the subset of regression test cases has highest scores among the plurality of regression test cases.

16. The method of claim 1 executing the regression test case on the system comprises:
executing a subset of a plurality of regression test cases, wherein the subset of regression test cases has highest scores among the plurality of regression test cases.

17. The method of claim 1 executing the regression test case on the system comprises:
verifying the selection of the regression test case for use in the regression testing effort based on a change in defect tickets.

18. A system comprising:
at least one processing device comprising a processor coupled to a memory; the at least one processing device being configured:
to select, by a test selection system, a regression test case from a plurality of regression test cases in a software testing lifecycle system;
to calculate a score for the regression test case using an Analytic Hierarchy Process (AHP) assigned weight, wherein the AHP assigned weight is determined based on multiple valued factors including feature coverage, code coverage, test point coverage, and defect ticket;
using the score, to automatically generate, by the test selection system, a visual representation displaying quantified relationships between the regression test case and specific regression testing coverage objectives for the software system;
to select, by the test selection system, the regression test case for use in the regression testing effort based on the visualized relationship that demonstrates optimal resource allocation for achieving the regression testing coverage objectives;
to automatically execute the regression test case on a system to detect software defects; and visualizing the relationship to determine an optimal number of regression test cases to execute on the system by displaying a graphical representation showing how incremental addition of regression test cases affects achievement of regression testing coverage goals until reaching an inflection point where the marginal benefit of adding more regression test cases begins to diminish significantly.

19. A computer program product comprising a non-transitory processor-readable storage medium having stored therein program code of one or more software programs, wherein the program code when executed by at least one processing device causes said at least one processing device:

to select, by a test selection system, a regression test case from a plurality of regression test cases in a software testing lifecycle system;

to calculate a score for the regression test case using an Analytic Hierarchy Process (AHP) assigned weight, wherein the AHP assigned weight is determined based on multiple valued factors including feature coverage, code coverage, test point coverage, and defect ticket;

using the score, to automatically generate, by the test selection system, a visual representation displaying quantified relationships between the regression test case and specific regression testing coverage objectives for the software system;

to select, by the test selection system, the regression test case for use in the regression testing effort based on the visualized relationship that demonstrates optimal resource allocation for achieving the regression testing coverage objectives;

to automatically execute the regression test case on a system to detect software defects; and visualizing the relationship to determine an optimal number of regression test cases to execute on the system by displaying a graphical representation showing how incremental addition of regression test cases affects achievement of regression testing coverage goals until reaching an inflection point where the marginal benefit of adding more regression test cases begins to diminish significantly.

\* \* \* \* \*